United States Patent [19]

Johnson et al.

[11] Patent Number: 4,647,963
[45] Date of Patent: Mar. 3, 1987

[54] COLOR ENHANCEMENT

[75] Inventors: Anthony J. Johnson, Bedfordshire; Paul E. Franklin, Berkhamstead, both of England

[73] Assignee: Crosfield Electronics (USA) Limited, England

[21] Appl. No.: 773,919

[22] Filed: Sep. 9, 1985

[30] Foreign Application Priority Data

Sep. 12, 1984 [GB] United Kingdom ............... 8422988

[51] Int. Cl.$^4$ ............................................. H04N 1/46
[52] U.S. Cl. ........................................ 358/80; 358/75
[58] Field of Search ....................... 358/80, 75, 27, 29, 358/29 C, 40, 21 R

[56] References Cited

U.S. PATENT DOCUMENTS

| | | | |
|---|---|---|---|
| 2,962,544 | 11/1960 | Gretener. | |
| 3,324,235 | 6/1967 | Kyte | 358/80 |
| 4,060,829 | 11/1977 | Sakamoto | 358/80 |
| 4,402,007 | 8/1983 | Yamada. | |
| 4,547,797 | 10/1985 | Mick | 358/27 |

FOREIGN PATENT DOCUMENTS 1257574 12/1967 Fed. Rep. of Germany.

Primary Examiner—Michael A. Masinick
Assistant Examiner—Robert Michael Bauer
Attorney, Agent, or Firm—Sughrue, Mion, Zinn, Macpeak and Seas

[57] ABSTRACT

Methods of electronically enhancing one or more color components (C, Y, M) which together represent the chromatic components of a pixel of an image are described. The methods comprise subtracting from each color component respective quantities which when combined correspond to a grey level (4) to generate reduced color components. These reduced color components are then multiplied by a factor and the modified reduced color components are then added back to the subtracted quantities or to the original color components to generate enhanced color components (13,14), whereby the factor is chosen such that the hue of the original pixel is not substantially changed after enhancement. In one method, the magnitude of the maximum reduced color component is determined and a factor is chosen which is related to the determined magnitude. In another method, the color components are ranked in order of magnitude and compared to derive two equivalent color component values. The magnitude of the maximum equivalent color component is determined and the factor chosen is related to the determined magnitude of a maximum equivalent color component.

10 Claims, 5 Drawing Figures

COLOR ENHANCEMENT

In the field of electronic image generation, an original image is divided into a large number of pixels and the colour of each pixel is represented by a number of colour components in the form of analogue or digital signals which are then used, usually after modification, to control corresponding exposing beams in order to generate corresponding half-tone colour separations or continuous tone plates in the case of gravure printing. The colour components may be represented in the form of digital or analogue signals corresponding to half-tone dot sizes or colour densities.

Printers often want to make their picture more colourful and in particular wish to increase the saturation of the pastel shades without affecting their hue.

In accordance with one aspect of the present invention, a method of electronically enhancing one or more colour components which together represent the chromatic component of a pixel of an image comprises subtracting from each colour component respective quantities which when combined correspond to a grey level to generate reduced colour components; determining the magnitude of the maximum reduced colour component; multiplying the reduced colour components by a factor related to the determined magnitude to generate modified reduced colour components; and adding the modified reduced colour components to the subtracted quantities or to the original colour components to generate enhanced colour components, whereby the factor is chosen such that the hue of the original pixel is not substantially changed after enhancement.

As has previously been mentioned, the colour components could comprise analogue signals or digital data representing colour densities or half-tone dot percentages or some other quantities, as appropriate. The method enables automatic processing to be achieved since the factor is chosen in accordance with the colour components themselves.

The invention enables a boost to be selectively applied to certain colours by looking for the maximum reduced colour component which provides an indication of the saturation (or colourfulness) of the colour involved. The size of the factor is then chosen in accordance with the saturation.

In the first aspect of the invention, all colours are equally affected by the factor whose magnitude relates primarily to the maximum reduced colour component. In some cases, however, a more flexible system is required.

In accordance with a second aspect of the present invention, a method of electronically enhancing one or more colour components which together represent the chromatic component of a pixel of an image comprises deriving two equivalent colour component values related to differences between the colour components; determining the magnitude of the maximum equivalent colour component; subtracting from each colour component respective quantities which when combined correspond to a grey level to generate reduced colour components; multiplying the reduced colour components by a factor related to the determined magnitude of the maximum equivalent colour component to generate modified reduced colour components; and adding the modified reduced colour components to the subtracted quantities or to the original colour components to generate enhanced colour components, whereby the factor is chosen such that the hue of the original pixel is not substantially changed after enhancement.

With this method colours of different hues may be boosted to different levels if required. Typically, the original colour components will represent cyan (C), magenta (M), and yellow (Y). These colour components may be ranked by comparing the values of the signal which, as before, may represent for example colour densities to produce a ranking of for example Y M C. Equivalent colour component values (which are typically related to colourfulness) may thenbe generated by subtracting the middle value (M) from the largest value (Y) and by subtracting the lowest value (C) from the middle value (M). The first subtraction generates an equivalent yellow value while the second subtraction generates an equivalent red value. These two equivalent colour component values are then compared to determine the magnitude of the maximum equivalent colour component which is then used to select the appropriate factor.

If the lowest value colour component is magenta then the second subtraction defined above will generate a green equivalent colour component while if the lowest value signal is yellow, the second subtraction will generate a violet equivalent colour component.

This may be defined more generally as follows:

Equivalent CYAN $= P [(C-M)+N (M-Y)]$

Equivalent YELLOW $= P [(Y-C)+N (C-M)]$

Equivalent GREEN $= P [(C-M)+N (Y-C)]$

Equivalent MAGENTA $= P [(M-Y)+N (Y-C)]$

Equivalent VIOLET $= P [(M-Y)+N (C-M)]$

Equivalent RED $= P [(Y-C)+N (M-Y)]$

The N operator denotes that the term in round brackets is only taken if negative. The P operator signifies that the expression in square brackets is only allowed if positive. Considering the equivalent yellow signal, if M is greater than C, the expression within the square brackets amounts to $(Y-C+C-M)$, i.e. $(Y-M)$ as before.

In some examples, methods in accordance with the second aspect of the invention may further comprise selecting a colour coefficient corresponding to the colour of the maximum equivalent colour component, the factor being generated by deriving an intermediate factor according to the magnitude of a maximum equivalent colour component, and multiplying the intermediate factor by the selected coefficient.

In some cases, the factor may be determined by deriving an intermediate factor in accordance with either the magnitude of the maximum reduced colour component or the magnitude of the maximum equivalent colour component; and multiplying the intermediate factor by a grey level factor chosen in accordance with the subtracted grey level.

Preferably, the factor has a minimum value for a reduced colour component of zero and for a reduced colour component near 100%. This prevents the enhancement of both near neutral and saturated colours.

The invention is particularly applicable to the enhancement of pastel shades, most particularly when the factor is modified in accordance with the magnitude of the grey level, and in this case the value of the factor preferably has a maximum near zero colour component and particularly preferably positioned between zero and 30% colour component.

By removing a grey level before multiplying the colour components, a change in hue is substantially prevented but the chance of a significant change in hue may further be avoided if the factor varies between a minimum of one and a maximum of two where the modified reduced colour components are added to the subtracted quantities or between 0 and 1 where the modified reduced colour components are added to the original colour components.

Although in general the factor will have a positive value it is possible in certain circumstances for the factor to have a negative value and the term "enhancement" should be understood accordingly.

The meaning of the "percentage" of colour component depends on what the colour component represents. For example if the colour component represents halftone dot size then the percentage is a percentage of the maximum dot size permitted. Alternatively, if the colour component represents colour density then the percentage will be a percentage of some chosen maximum density. Typically, colour or print density is defined in terms of a linear scale of 0-2.

Examples of apparatus for carrying out two methods in accordance with the present invention will now be described with reference to the accompanying drawings, in which.

Apparatus for carrying out methods according to the invention can be realised in both a hardware based form and a software based form. In this specification, the first example will be illustrated in conjunction with a hardware based system while the second method will be illustrated in conjunction with a software based system.

Figure 1:
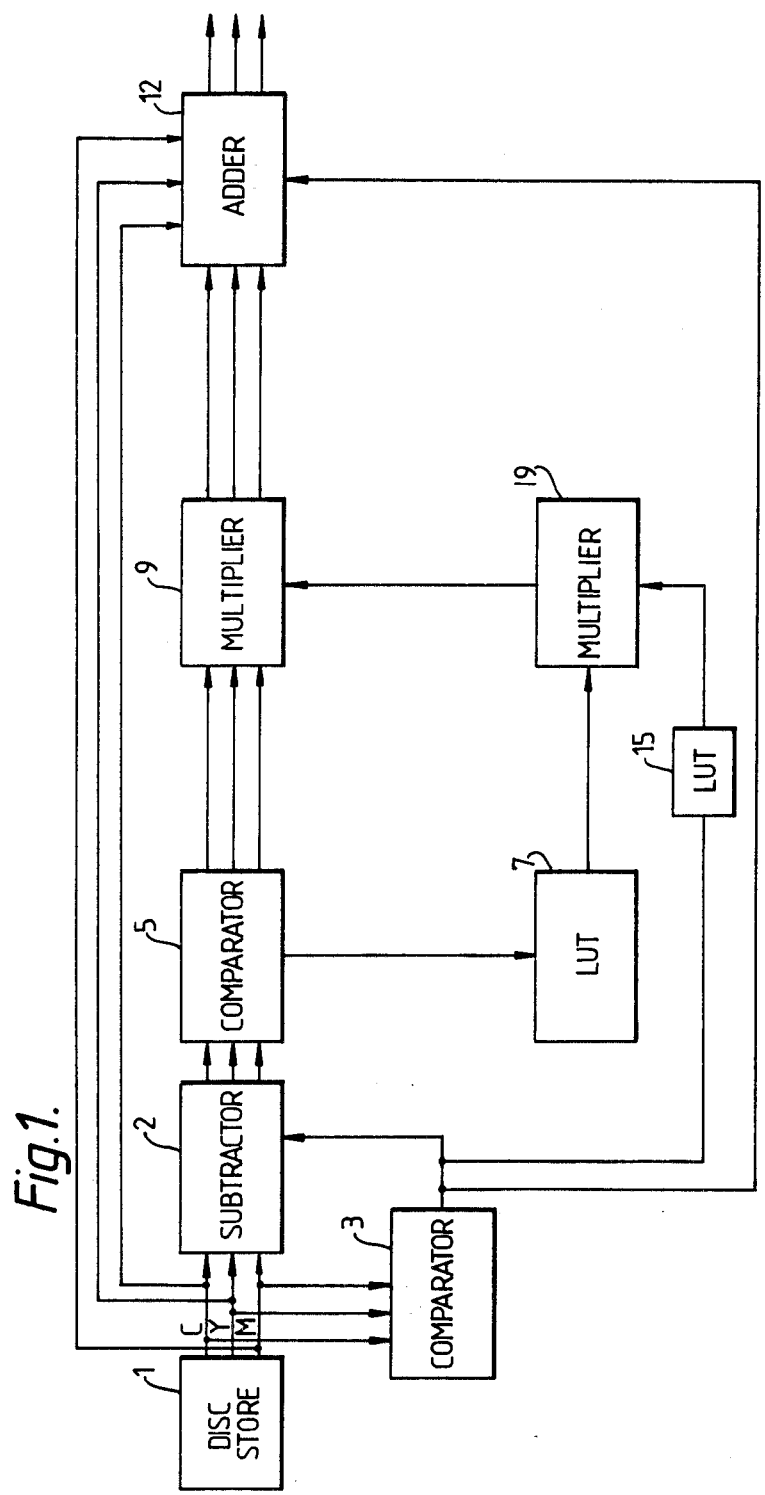
FIG. 1 is a block diagram of hardware based apparatus for carrying out a first example of a method according to the invention.

The apparatus shown in FIG. 1 comprises a disc store 1 which stores colour component data representing the densities of cyan (C), yellow (Y), and magenta (M) for each pixel of an original image. This data may have been generated in a conventional manner by, for example, our Crosfield Magnascan 645 system or alternatively, the disc store 1 could be omitted with the data being fed directly to a subtractor 2 and a comparator 3.

The hardware components illustrated in FIG. 1 are controlled by a suitably programmed microcomputer, not shown.

Figure 3:
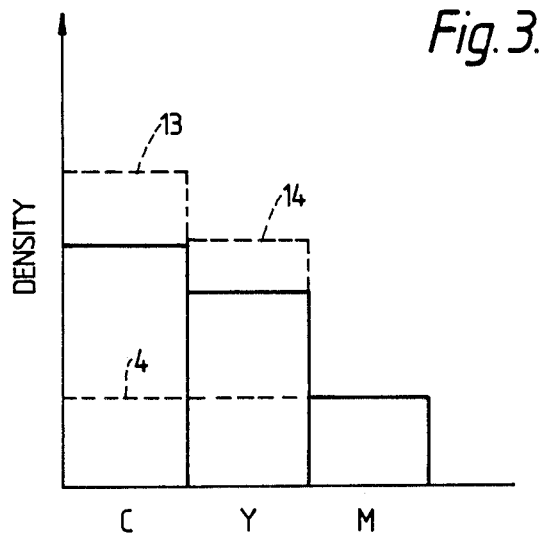
FIG. 3 is a histogram illustrating the densities of three colour components of a pixel.

An example of the magnitudes of the colour component signals for one pixel are illustrated by the solid lines in FIG. 3. These magnitudes are compared in the comparator 3 to determine which signal has the least value, M in this example. This minimum signal is then fed to the subtractor 2 where it is subtracted from each of the three incoming colour component values. In this case, where the signals represent colour densities, the quantity to be subtracted is the same for each colour component and correspond to a grey level. This grey level is illustrated by a line 4 in FIG. 3.

Figure 2:
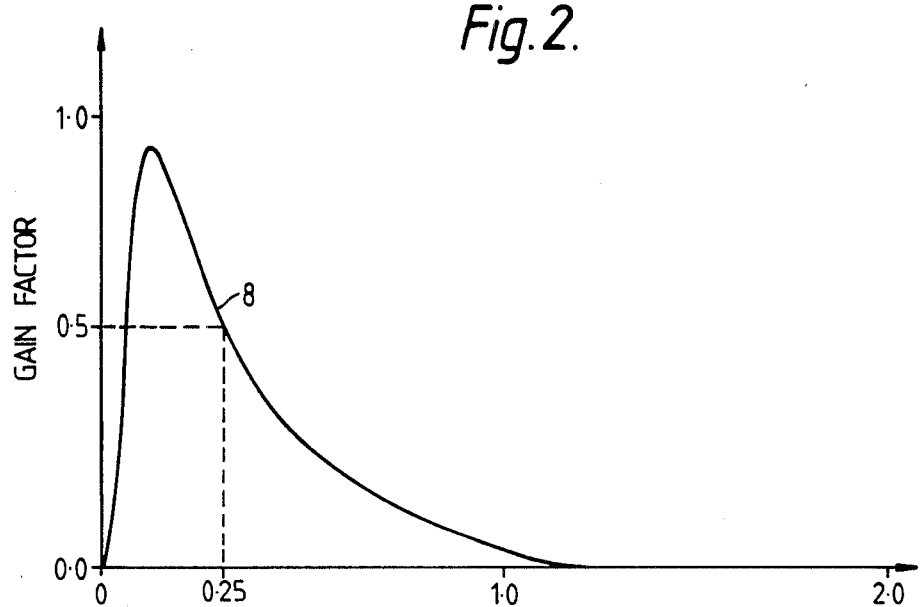
FIG. 2 illustrates the variation of the multiplying factor with print density.

The three signals representing the results of this subtraction, one of which is zero, are fed to a comparator 5 where they are compared to determine which is the largest signal corresponding to the maximum reduced colour component. In this case, the reduced cyan signal has a greater magnitude than the reduced yellow signal. The maximum reduced colour component signal is fed from the comparator 5 to a look-up table (LUT) 7. The LUT 7 contains a range of values for each possible signal defining a gain factor. The variation of this gain factor with signal is illustrated in FIG. 2 by a line 8 and is determined empirically. It will be seen that the factor is equal to 0 at the origin corresponding to a neutral colour in the original pixel and is also zero for densities near to 1.2 corresponding to pure colours in the original pixel. For intermediate colours, particularly the so called pastel colours, the factor defined by the line 8 reaches a peak of about 0.9 at a signal of about 0.1.

In this example, if the reduced cyan signal represents 0.25 print density then the gain factor selected from the LUT 7 will be 0.5.

In the simplest form of the invention (not shown), this gain factor from the LUT 7 is fed directly to a multiplier 9 which receives the two reduced colour component signals from the comparator 5. The reduced colour component signals are multiplied in the multiplier 9 by the selected factor and the multiplied signals are fed to an adder 12. In the adder 12, the multiplied signals are added to the original (C, Y, M) signals from the disc store 1 to produce enhanced colour component signals as illustrated by the dashed lines 13, 14 in FIG. 3. Since the reduced magenta signal was zero, the resultant magenta signal will have the same magnitude as the original signal.

Alternatively, where the factor varies between 1 and 2, the signals from the multiplier 9 are added to a signal from the comparator 3 representing the subtracted grey level.

Figure 4:
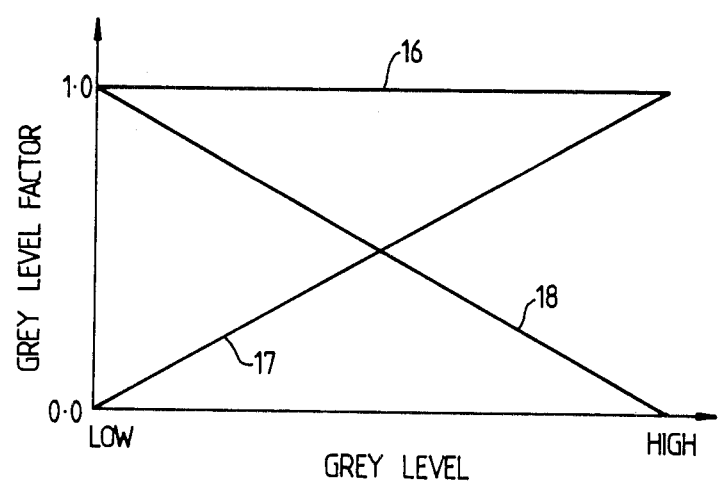
FIG. 4 illustrates graphically three ways in which a grey level factor may vary with grey level; and, FIG. 5 is a flow diagram illustrating operation of software based apparatus for carrying out a second example of a method according to the invention.

The apparatus shown in FIG. 1 illustrates an enhancement over the simple arrangement described. In this enhancement, the grey level signal from the comparator 3 is fed to an additional LUT 15 which contains values defining a grey level factor. The variation of the grey level factor with grey level may take a variety of forms some of which are illustrated in FIG. 4. In the simple form of the invention described above, the grey level factor effectively has a constant value of 1.0 irrespective of the size of the grey level. This is illustrated by a line 16 in FIG. 4. In other examples, the variation of the grey level factor with grey level may have the form illustrated by lines 17 or 18. If the variation of grey level factor has the form indicated by the line 17 then "dirty" colours will be most affected ie those with a high grey level, whereas if the variation of grey level factor is indicated by the line 18 then "clean" colours will be most affected.

The grey level factor chosen from the LUT 15 is fed to a multiplier 19 along with the gain factor from the LUT 7. The gain factor is then multiplied by the grey level factor by the multiplier 19 with the resultant factor being fed to the multiplier 9. Subsequent processing is as previously described.

For maximum flexibility, the LUT 15 may contain values defining all three variations of grey level factor with grey level defined by the lines 16–18, the microcomputer controlling which of these sets of values is addressed by the grey level signal from the comparator 3.

Figure 5:
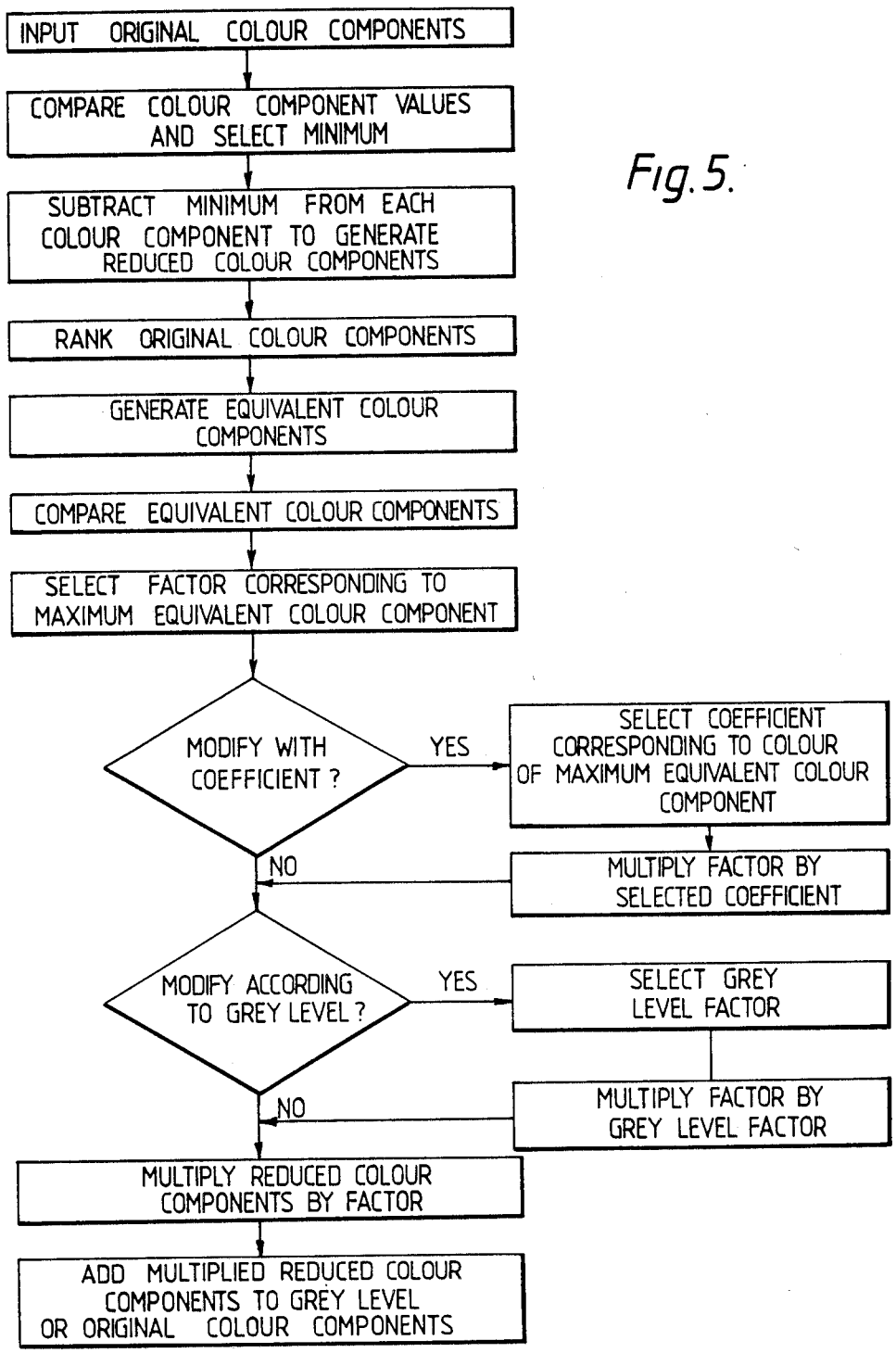

A second example of the invention will now be described with reference to the FIG. 5 which is a flow diagram defining the steps carried out by a suitably programmed microcomputer.

Initially, the original colour component signals, in digital form, are fed into the computer which compares the colour density values and selects the minimum colour density. This minimum colour density is then subtracted from each of the colour component values to generate reduced colour component values.

In addition, the original colour component values are ranked in order of magnitude. For example, if the colour densities of the three colour components are represented by C, Y, M then they may be ranked in order Y M C with Y having the largest value. The Y and M values and the M and C values are subtracted to generate equivalent colour component values such that:

equivalent Y = Y − M equivalent R = M − C

Thus, the difference between the magenta and cyan signals provides an indication of the redness in the original colour.

In other examples, if magenta has the lowest colour density then the difference between the two lowest value signals will provide an equivalent green component while if yellow has the lowest colour density then the difference between the two lowest colour density values will define an equivalent violet.

In any case, unless two or more of the original colour densities are equal, two equivalent colour component values will be generated. These equivalent colour component values are then compared to determine the maximum equivalent colour component. This maximum equivalent colour component is then used to address a look-up table which defines a gain factor having a similar form to that shown in FIG. 2. The gain factor corresponding to the maximum equivalent colour component value is selected.

In this method, the selected gain factor may then be used directly or it may be modified in up to two different ways.

Firstly, the gain factor may be modified in accordance with the colour of the maximum equivalent colour component. Since there are six possible equivalent colour components C, Y, M, R, G and V, six coefficients are empirically determined and stored in a look-up table. The microcomputer then determines whether modification by a coefficient is required and if it is determines the colour of the larger equivalent colour component and selects the corresponding coefficient. The previously selected gain factor is then multiplied by this coefficient. A typical coefficient has a value of 0.2.

Each of the coefficients will typically be in the range 0–1 but coefficients greater than 1.0 or less than zero are also feasible.

The microcomputer then determines whether the gain factor is to be modified or additionally modified in accordance with the subtracted grey level. This is similar to the modification described in relation to the first example. If such a modification is required, a look-up table is addressed using the subtracted grey level and a grey level factor is selected. This factor may, for example, be defined in a similar manner to that shown in FIG. 4. The selected gain factor, possibly after modification by a coefficient, is then multiplied by the grey level factor.

The resultant factor is then used to multiply the reduced colour components and finally the multiplied reduced colour components are added either to the subtracted grey level or the original colour components.

We claim:

1. A method of electronically enhancing at least one of a plurality of colour components which together represent the chromatic component of a pixel of an image, the method comprising subtracting from each said colour component respective quantities which when combined correspond to a grey level to generate reduced colour components; determining the magnitude of the reduced colour component with the largest magnitude; multiplying said reduced colour components by a factor related to said determined magnitude to generate modified reduced colour components; and adding said modified reduced colour components respectively to each one of said subtracted quantities or said original colour components to generate enhanced colour components, whereby said factor is chosen such that the hue of said original pixel is not substantially changed after enhancement.

2. A method according to claim 1, wherein said factor is determined by deriving an intermediate factor in accordance with said magnitude of said reduced colour component with the largest magnitude; and multiplying said intermediate factor by a grey level factor chosen in accordance with the grey level defined by said subtracted quantities.

3. A method according to claim 1, wherein said factor has a minimum value for a reduced color component with the largest magnitude of zero and for a reduced colour component with the largest magnitude at a maximum possible value of said colour component.

4. A method according to claim 3, wherein said factor has a maximum value between zero and 30% of said maximum possible value of said colour component.

5. A method of electronically enhancing at least one of a plurality of original colour components which together represent the chromatic component of a pixel of an image, the method comprising deriving two equivalent colour component values related to differences between said original colour components; determining the magnitude of the maximum equivalent colour component; subtracting from each said original colour component respective quantities which when combined correspond to a grey level to generate reduced colour components; multiplying said reduced colour components by a factor related to said determined magnitude of said maximum equivalent colour component to generate modified reduced colour components; and adding said modified reduced colour components respectively to each one of said subtracted quantities or said original colour components to generate enhanced colour components, whereby said factor is chosen such that the hue of said original pixel is not substantially changed after enhancement.

6. A method according to claim 5, further comprising selecting a colour coefficient corresponding to the colour of said maximum equivalent colour component, said factor being generated by deriving an intermediate factor according to said magnitude of said maximum equivalent colour component, and multiplying said intermediate factor by said selected coefficient.

7. A method according to claim 5, wherein said factor is determined by deriving an intermediate factor in accordance with said magnitude of said maximum equivalent colour component; and multiplying said intermediate factor by a grey level factor in accordance with the grey level defined by said subtracted quantities.

8. A method according to claim 5, wherein said factor is determined by deriving a first intermediate factor in accordance with said magnitude of said maximum equivalent colour component; multiplying said first intermediate factor by a grey level factor chosen in accordance with the grey level defined by said subtracted quantities to generate a second intermediate factor; selecting a colour coefficient corresponding to said colour of said maximum equivalent colour component; and multiplying said second intermediate factor by the selected coefficient to generate the factor.

9. A method according to claim 5, wherein said factor has a minimum value for a maximum equivalent colour component of zero and for a maximum equivalent colour component at a maximum possible value of said maximum equivalent colour component.

10. A method according to claim 9, wherein said factor has a maximum value between zero and 30% of said maximum possible value of said maximum equivalent colour component.

* * * * *